US012609260B2

(12) United States Patent
Rosher

(10) Patent No.: US 12,609,260 B2
(45) Date of Patent: Apr. 21, 2026

(54) ELECTRICITY LEAK PROTECTION UNIT FOR EACH PHASE LINE

(71) Applicant: Itay Rosher, Ramat-Gan (IL)

(72) Inventor: Itay Rosher, Ramat-Gan (IL)

( * ) Notice: Subject to any disclaimer, the term of this patent is extended or adjusted under 35 U.S.C. 154(b) by 230 days.

(21) Appl. No.: 18/383,937

(22) Filed: Oct. 26, 2023

(65) Prior Publication Data

US 2025/0140502 A1 May 1, 2025

(51) Int. Cl.
*H01H 71/04* (2006.01)
*H01H 71/40* (2006.01)

(52) U.S. Cl.
CPC ............ *H01H 71/04* (2013.01); *H01H 71/40* (2013.01)

(58) Field of Classification Search
CPC ............................... H01H 71/04; H01H 71/40
USPC ............................................................ 361/42
See application file for complete search history.

(56) References Cited

U.S. PATENT DOCUMENTS

| | | | | |
|---|---|---|---|---|
| 5,546,266 A * | 8/1996 | Mackenzie | H02H 3/04 | 361/115 |
| 2005/0105234 A1* | 5/2005 | McCoy | H01H 83/20 | 361/103 |
| 2007/0030608 A1* | 2/2007 | Baldwin | H01H 83/04 | 361/42 |

FOREIGN PATENT DOCUMENTS

| | | |
|---|---|---|
| CN | 111640605 | 9/2020 |
| JP | 2019057965 | 4/2019 |
| JP | 2019057965 A * | 4/2019 |

* cited by examiner

*Primary Examiner* — Sreeya Sreevatsa
(74) *Attorney, Agent, or Firm* — AlphaPatent Associates Ltd.; Daniel J. Swirsky

(57) ABSTRACT

An electricity protection unit, including for each of at least one phase line: a thermo-magnetic circuit breaker, for cutting the phase electric line upon exceeding an electric threshold thereof; and an indication gadget connected to the thermo-magnetic circuit breaker, for receiving an electric leak between a consumer and a metallic package of any electric appliance consuming electricity from the phase electric line, and for indicating the electric leak, thereby indicating which of the at least one phase line includes the electric leak.

10 Claims, 5 Drawing Sheets

FIG 1 - PRIOR ART

ELECTRICITY LEAK PROTECTION UNIT FOR EACH PHASE LINE

TECHNICAL FIELD

The invention relates to the field of electricity protection unit. More particularly, the invention relates to a method and apparatus for treating electric leaks.

BACKGROUND

FIG. 1 is a diagram of a prior art residential electric system.

An exemplary house 70 includes electric appliance 72A such as an air conditioner powered by a Phase electric line 78A; and an electric appliance 72B such as a water boiler, powered by a Phase electric line 78B.

Each of electric appliances 72A and 72B includes an electric consumer 48 and a metallic package 46.

Electric consumer 48 of electric appliance 72A is plugged to Phase electric line 78A and to a neutral electric line 80; and metallic package 46 of electric appliance 72A is plugged to Earth line 82.

Electric consumer 48 of electric appliance 72B is plugged to Phase electric line 78B and to Neutral electric line 80 used by electric appliance 72A; and metallic package 46 of electric appliance 72B is plugged to Earth line 82 used by electric appliance 72A.

A prior art electricity protection unit 79 includes a thermo-magnetic circuit breaker 74A1 for cutting Phase electric line 78A upon exceeding electric threshold thereof; a thermo-magnetic circuit breaker 74B1 for cutting phase electric line 78B upon exceeding electric threshold thereof; and a differential circuit breaker 76 for cutting phase electric lines 78A and 78B and as well neutral electric line 80 altogether upon presence of an electric leak 84A between consumer 48 and metallic package 46 of electric appliance 72A, or upon presence of an electric leak 84B between consumer 48 and metallic package 46 of electric appliance 72B.

Differential circuit breaker 76 is disadvantaged in not indicating which of the electric lines has caused the leak.

There is a long felt need to provide a solution to the above-mentioned and other problems of the prior art.

SUMMARY

An electricity protection unit, including for each phase line:

a thermo-magnetic circuit breaker; and an indication gadget for indicating electric leak (84A).

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to leg out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
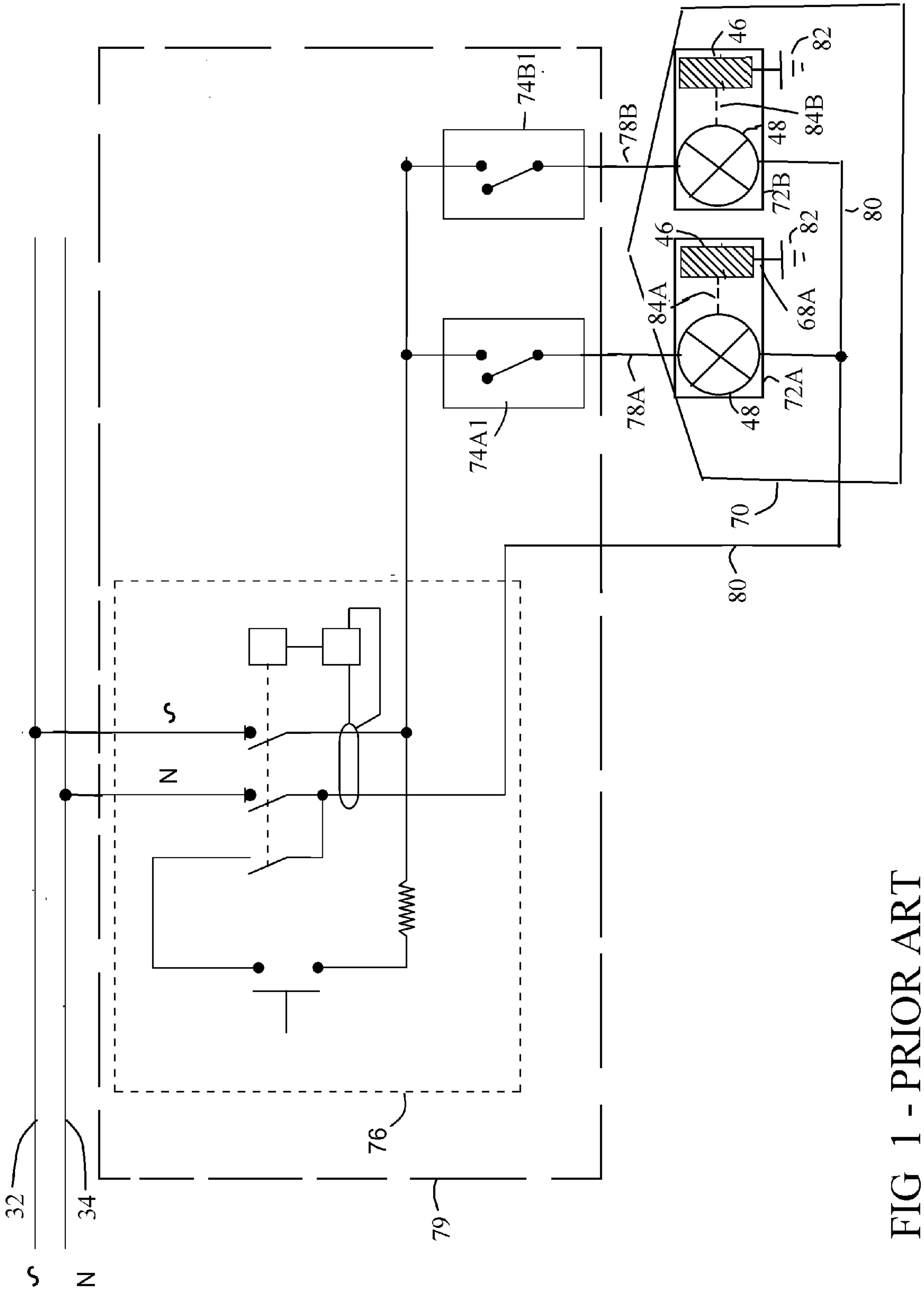
FIG. 1 is a diagram of a prior art residential electric system.
Figure 2:
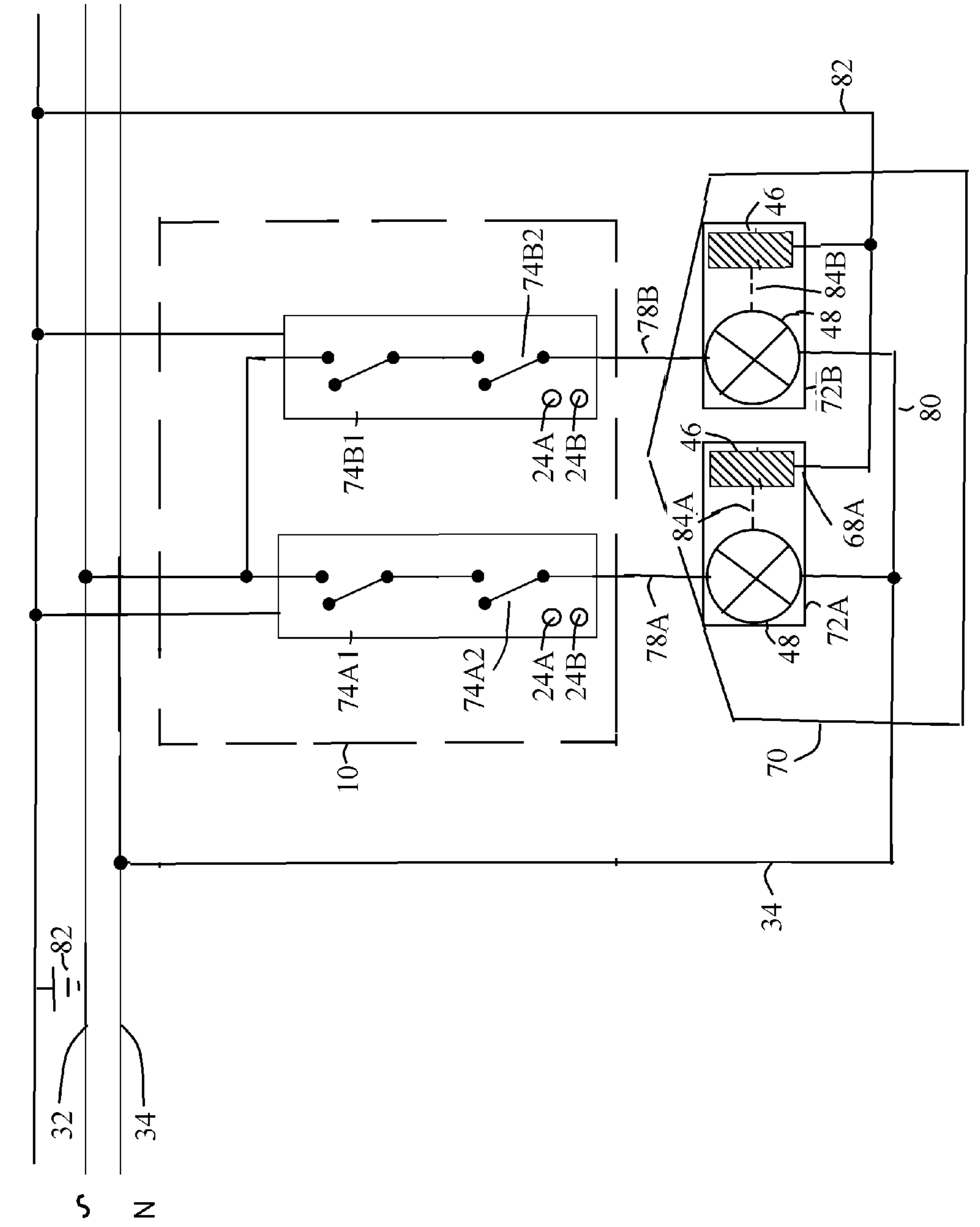
FIG. 2 is a diagram of a residential electric system including an electricity protector according to one embodiment of the invention.

FIG. 2 is a diagram of a residential electric system including an electricity protector according to one embodiment of the invention.

Exemplary house 70 includes electric appliance 72A such powered by phase electric line 78A; and electric appliance 72B, powered by phase electric line 78B.

Each of electric appliances 72A and 72B includes electric consumer 48 and metallic package 46.

Electric consumer 48 of electric appliance 72A is plugged to phase electric line 78A and to neutral electric line 34; and metallic package 46 of electric appliance 72A is plugged to earth line 82.

Figure 3:
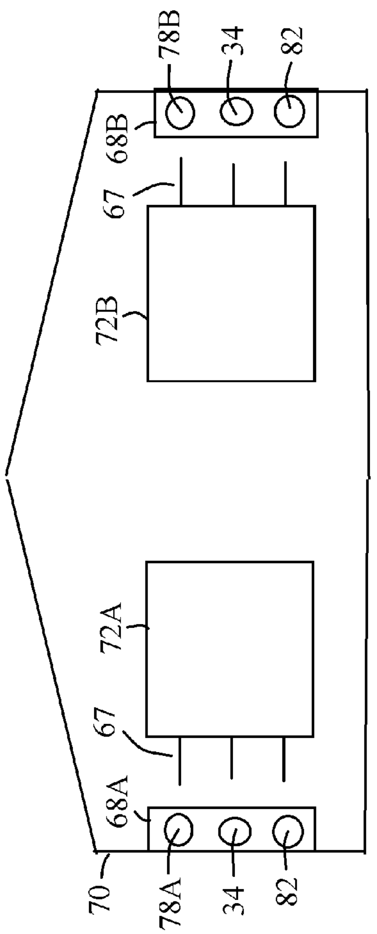
FIG. 3 depicts the plugging of the electric appliances of FIG. 2 to sockets of the house.

Electric consumer 48 of electric appliance 72B is plugged to phase electric line 78B and to neutral electric line 34 used by electric appliance 72A; and metallic package 46 of electric appliance 72B is plugged to earth line 82 used by electric appliance 72A. FIG. 3 depicts the plugging of the electric appliances of FIG. 2 to sockets of the house.

A plug 67 of electric appliance 72A is plugged to a socket 68A connected to phase electric line 78A, neutral line 34 and earth 82; and a plug 67 of electric appliance 72B is plugged to a socket 68B connected to phase electric line 78B, neutral line 34 and earth 82.

Referring again to FIG. 2, an electricity protection unit 10 according to one embodiment of the invention, includes thermo-magnetic circuit breaker 74A1 for cutting phase electric line 78A upon exceeding electric threshold thereof; a switch 74A2 being serially connected to thermo-magnetic circuit breaker 74A1, for cutting phase electric line 78A upon presence of electric leak 84A between consumer 48 and metallic package 46 of electric appliance 72A; thermo-magnetic circuit breaker 74B1 for cutting phase electric line 78B upon exceeding electric threshold thereof; and a switch 74B2 for cutting phase electric line 78B upon presence of electric leak 84B from consumer 48 to metallic package 46 of electric appliance 72B.

Each of switches 74A2 and 74B2 is advantaged in cutting the electric line which has caused the leak while not cutting the other, thus indicating the source of the leak.

Switch 74A2 detects leak 84A between consumer 48 and metallic package 46 of electric appliance 72B, by being inputted with neutral electric line 34 and earth line 82.

Figure 4:
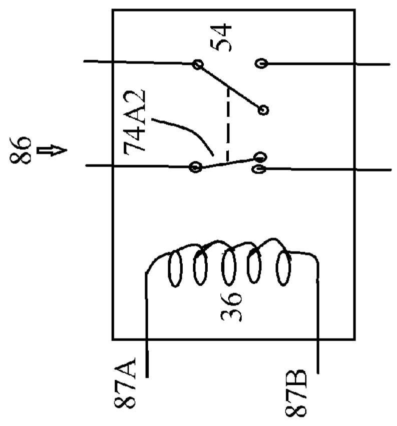
FIG. 4 depicts a relay including one of the leak circuit breakers of FIG. 2.

FIG. 4 depicts a relay including one of the leak circuit breakers of FIG. 2.

A relay 86 includes switch 74A2, being normally closed; a switch 54 being normally open; and a coil 36 for opening switch 74A2 and for closing switch 54 upon powering coil 36.

Figure 5:
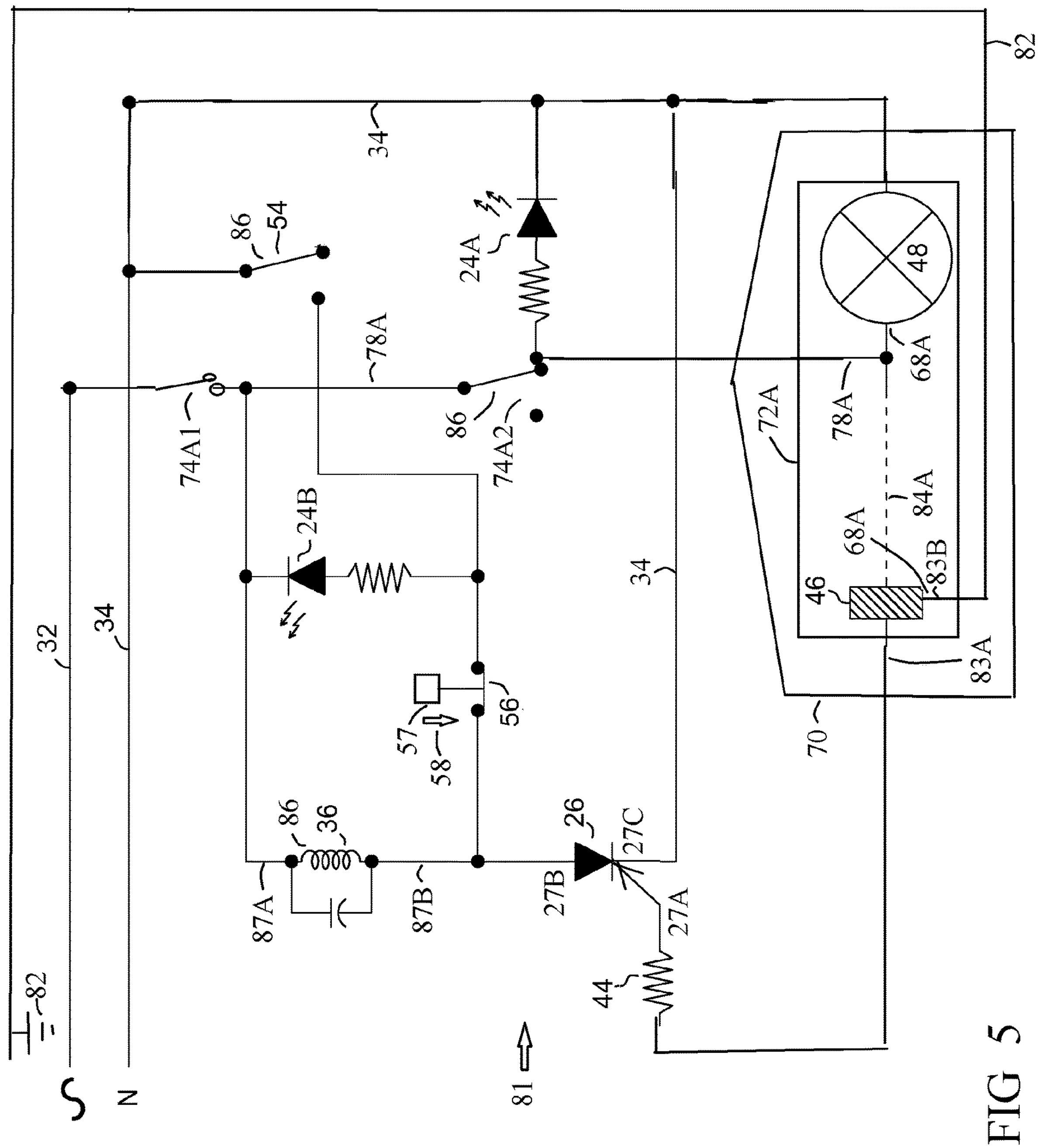
FIG. 5 depicts an electric circuit for controlling one of the switches of FIG. 2.

FIG. 5 depicts an electric circuit for controlling one of the switches of FIG. 2.

Circuit 81 controls relay 86 of FIG. 4, and thus switch 74A2 thereof as described following.

Input 87A of coil 36 is constantly connected to phase line 78A, whereas input 87B of coil 36 does not receive neutral line 34, even though neutral line 34 is constantly connected to leg 27C of a gate element 26, since gate element 26 is yet cut.

Thus, switch 72A2 is normally closed, thus switch 72A2 normally connects phase line 78A to consumer 48 and to green bulb 24A.

Neutral line 34 is constantly connected to consumer 48 of appliance 72A and to bulb 24A, thus since phase line 78A is normally connected to consumer 48 and to green bulb 24A, consumer 48 and green bulb 24A are normally on.

A portion 83A of leak 84A is supplied to an input 27A of a gate element 26, through leak 84A once present, thus connecting leg 27*b* to 27*c* of gate element 26.

Neutral line 34 is constantly connected to leg 27C of gate element 26, thus once connecting leg 27*b* to 27*c* of gate element 26, coil 36 receives neutral line 34 as well as is powered.

Powering of coil 36 opens switch 74A2 to turn off consumer 48 and green bulb 24A, and further closes switch 54.

Closing of switch 54 maintains the neutral supply 34 to coil 36 for maintaining the turning off of consumer 48, even upon cease of leak 84A, and further turns on a red bulb 24B.

Upon cease of leak 84A, ceasing neutral supply 34 to coil 36, for turning on consumer 48 and green bulb 24A and for opening switch 54, is available by cutting neutral supply 34 by manually opening a switch 56 for a moment.

Figure 6:
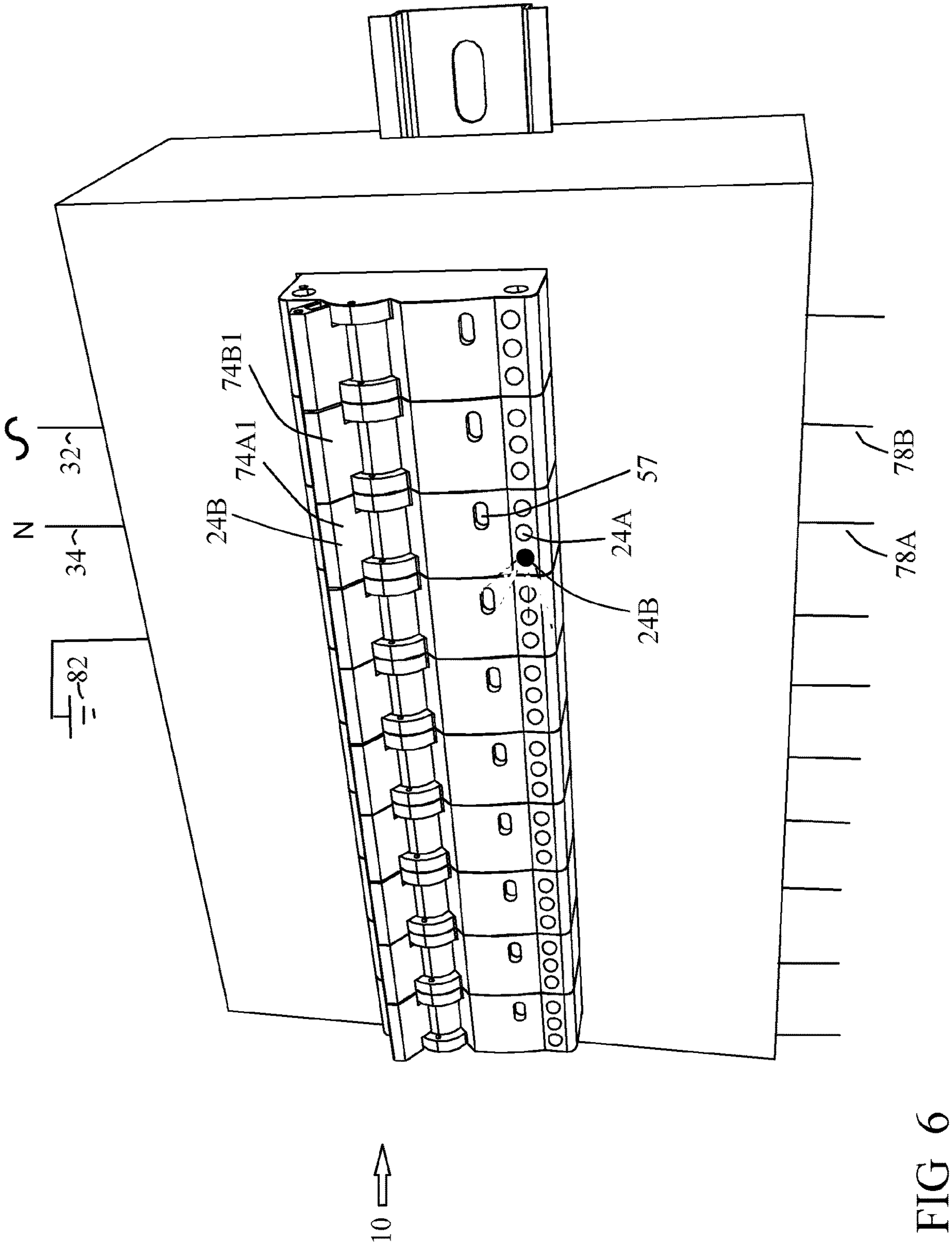
FIG. 6 is a perspective view of the electricity protection unit of FIG. 2.

FIG. 6 is a perspective view of the electricity protection unit of FIG. 2.

Manual opening of switch 56 of FIG. 5 is applicably by pressing (58) a button 57.

Switch 74A2 of FIG. 2 being housed and connected to thermo-magnetic circuit breaker 74A1 receives phase electric line 78A, neutral line 34 and earth 82 being connected to metallic package 46 of electric appliance 72A; and switch 74A2 of FIG. 2 being housed and connected to thermo-magnetic circuit breaker 74A2 receives phase electric line 78B, neutral line 34 and earth 82 being connected to metallic package 46 of electric appliance 72B.

Thus, in one aspect, the invention is directed to an electricity protection unit (10), including for each (78A) of at least one phase line (78A,78B):

- a thermo-magnetic circuit breaker (74A1), for cutting the phase electric line (78A) upon exceeding an electric threshold thereof; and
- an indication gadget (74A2,24A,24B) connected to the thermo-magnetic circuit breaker (74A1), for receiving an electric leak (84A) between a consumer (48) and a metallic package (46) of any electric appliance (72A) consuming electricity from the phase electric line (78A), and for indicating the electric leak (84A), thereby indicating which of the at least one phase line (78A,78B) includes the electric leak (84A).

The indication gadget may include:

- a first switch (74A2), being serially connected to the thermo-magnetic circuit breaker (74A1), thereby opening of the first switch (74A2) cuts the phase electric line (78A); and
- a circuit (81) for opening the first switch (74A2) upon presence of the electric leak (84A), thereby the cutting the phase electric line (78A) indicates that that phase electric line (78A) includes the leak (84A).

The indication gadget may further include:

- a first bulb (24A), for illuminating while neither the thermo-magnetic circuit breaker (74A1) nor the first switch (74A2) cut the phase electric line (78A).

The indication gadget may include:

- a second bulb (24B), for illuminating upon the cutting of the phase electric line (78A) by the first switch (74A2).

The circuit (81) may be electrically connected to the phase electric line (78A) and to the neutral electric line (34), for together opening the first switch (74A2); and

- may be electrically connected to the metallic package (46) of the electric appliance (72A) for applying the receiving of the electric leak (84A).

The circuit (81) may be configured to maintain the cutting of the phase electric line (78A) after cease of the electric leak (84A).

The circuit (81) may include a second switch (54) being configured to be closed by the electric leak (84A), and

- the closing the second switch (54) may be configured to maintain the closing of the second switch (54) and to open the first switch (74A2),
- thereby the closing the second switch (54) may maintain the cutting of the phase electric line (78A) after cease of the electric leak (84A).

The circuit (81) may include a third switch (56), for allowing manual (58) ceasing of the cutting of the phase electric line (78A) after the cease of the electric leak (84A).

The opening of the first switch (74A2) upon the presence of the electric leak (84A) may be powered by a portion (83A) of the electric leak (84A).

The circuit (81) may include a relay (86) including a coil (86),

- and powering of the coil (86) may open the first switch (74A2), and
- the powering the coil (86) may be supplied through a gate element (26) being openable by receiving a portion (83A) of the electric leak (84A), and
- the powering of the coil (86) may further close a second switch (54), and
  - the closing of the second switch (54) as well may power the coil (86) thereby maintains the opening of the first switch (74A2), thereby maintains the cutting of the phase electric line (78A) after cease of the electric leak (84A).

In the figures and/or description herein, the following reference numerals (Reference Signs List) have been mentioned:

- numeral 10 denotes the electricity protection unit according to one embodiment of the invention;
- 24A: indication gadget such as a green bulb indicating the line is OK;
- 24B: indication gadget such as a red bulb, or a vocal gadget, or a visually viewed fall-able switch for indicating an event of electric leak 84A;
- 26: gate element for electronically switching;
- 32: network phase supply;
- 34: network neutral supply, being as well the neutral electric line for thermo-magnetic circuit breaker 78A if not using differential circuit breaker 76;

36: coil of relay 86;
44: resistor;
46: metallic package of electric appliance 72A or of 72B;
48: consumer 48 of electric appliance 72A or of 72B;
54: switch of relay 86;
56: switch being openable by button 57;
57: button for manually ceasing cutting of phase electric line 78A;
58: pressing on button 57;
67: plugs of appliances 72A, 72B;
68A: socket of house 70 providing phase electric line 78A;
68B: socket of house 70 providing phase electric line 78B;
70: house including sockets 68A,68B;
72A1,72B1: electric appliances;
74A1,74B1: thermo-magnetic circuit breakers;
74A2: switch for cutting phase electric line 78A upon leak 84A within phase electric line 78A;
74B2: switch for cutting phase electric line 78B upon leak 84B within phase electric line 78B;
76: prior art differential circuit breaker, which may be eliminated for electricity protection unit 10;
78A: phase electric line powering electric appliance 72A;
78B: phase electric line powering electric appliance 72B;
79: prior art electricity protection unit;
80: neutral electric line after differential circuit breaker 76;
82: earth, to which metallic packages of electric appliances 72A and 72B are electrically connected by plugs 67 thereof;
83A: portion of electric leak 84A flowing to gate element 26;
83B: portion of electric leak 84A, flowing to earth 82;
84A,84B: electric leaks;
86: relay;
87A,87B: inputs to coil 36 of relay 86;

The foregoing description and illustrations of the embodiments of the invention have been presented for the purpose of illustration, and are not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

What is claimed is:

1. An electricity leak protection unit for a house, comprising:
a first thermo-magnetic circuit breaker, for cutting a first phase electric line of said house which is not a neutral line, upon exceeding an electric threshold thereof;
a first indication gadget connected to said first thermo-magnetic circuit breaker, for receiving a first electric leak between a consumer and a metallic package of any electric appliance consuming electricity from said first phase electric line, and for indicating said first electric leak;
a second thermo-magnetic circuit breaker, for cutting said a second phase electric line of said house which is not the neutral line, upon exceeding an electric threshold thereof; and
a second indication gadget connected to said second thermo-magnetic circuit breaker, for receiving a second electric leak between a consumer and a metallic package of any electric appliance consuming electricity from said second phase electric line, and for indicating said second electric leak.

2. The electricity leak protection unit according to claim 1, wherein said first indication gadget comprises:
a first switch, being serially connected to said first thermo-magnetic circuit breaker, thereby opening of said first switch cuts said first phase electric line; and
a circuit for opening said first switch upon presence of said first electric leak,
thereby said cutting said first phase electric line indicates that said phase electric line comprises said first leak.

3. The electricity leak protection unit according to claim 2, wherein said first indication gadget further comprises:
a first bulb, for illuminating while neither said first thermo-magnetic circuit breaker nor said first switch cut said first phase electric line.

4. The electricity leak protection unit according to claim 2, wherein said first indication gadget further comprises:
a second bulb, for illuminating upon said cutting of said first phase electric line by said first switch.

5. The electricity leak protection unit according to claim 2, wherein said circuit is electrically connected to said first phase electric line and to a neutral electric line, for together opening said first switch; and
is electrically connected to said metallic package of said any electric appliance consuming electricity from said first phase electric line for applying said receiving of said first electric leak.

6. The electricity leak protection unit according to claim 2, wherein said circuit is configured to maintain said cutting of said first phase electric line after cease of said first electric leak.

7. The electricity leak protection unit according to claim 2, wherein said circuit comprises a second switch being configured to be closed by said first electric leak,
wherein said closing said second switch is configured to maintain said closing of said second switch and to open said first switch,
thereby said closing said second switch maintains said cutting of said first phase electric line after cease of said first electric leak.

8. The electricity leak protection unit according to claim 2, wherein said circuit comprises a third switch, for allowing manual ceasing of said cutting of said first phase electric line after said cease of said first electric leak.

9. The electricity leak protection unit according to claim 2, wherein said opening of said first switch upon said presence of said first electric leak is powered by a portion of said first electric leak.

10. The electricity leak protection unit according to claim 2, wherein said circuit comprises a relay comprising a coil,
wherein powering of said coil opens said first switch, and
wherein said powering said coil is supplied through a gate element being openable by receiving a portion of said first electric leak, and
wherein said powering of said coil further closes a second switch, and
wherein said closing said second switch as well powers said coil thereby maintains said opening of said first switch, thereby maintains said cutting of said first phase electric line after cease of said first electric leak.

* * * * *